(12) United States Patent
Nakamoto et al.

(10) Patent No.: US 9,899,706 B2
(45) Date of Patent: Feb. 20, 2018

(54) ELECTROLYTIC SOLUTION FOR FLUORIDE ION BATTERY AND FLUORIDE ION BATTERY

(71) Applicants: TOYOTA JIDOSHA KABUSHIKI KAISHA, Toyota-shi, Aichi-ken (JP); Kyoto University, Kyoto-shi, Kyoto (JP)

(72) Inventors: Hirofumi Nakamoto, Kyoto (JP); Zempachi Ogumi, Kyoto (JP); Jun-ichi Yamaki, Kyoto (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 196 days.

(21) Appl. No.: 14/687,426

(22) Filed: Apr. 15, 2015

(65) Prior Publication Data
US 2015/0303522 A1 Oct. 22, 2015

(30) Foreign Application Priority Data
Apr. 17, 2014 (JP) ................. 2014-085450

(51) Int. Cl.
*H01M 10/0569* (2010.01)
*H01M 10/05* (2010.01)
*H01M 6/16* (2006.01)
*H01M 10/0568* (2010.01)

(52) U.S. Cl.
CPC ....... *H01M 10/0569* (2013.01); *H01M 6/164* (2013.01); *H01M 10/05* (2013.01); *H01M 6/166* (2013.01); *H01M 10/0568* (2013.01); *H01M 2300/0028* (2013.01)

(58) Field of Classification Search
CPC ............ H01M 10/05; H01M 10/0568; H01M 10/0569; H01M 2300/0028; H01M 6/164; H01M 6/166
See application file for complete search history.

(56) References Cited

U.S. PATENT DOCUMENTS

| 2004/0094741 A1* | 5/2004 | Sato ................ C07C 217/08 252/1 |
| 2007/0037064 A1 | 2/2007 | Nishida et al. |
| 2008/0050657 A1 | 2/2008 | Nishida et al. |

(Continued)

FOREIGN PATENT DOCUMENTS

| CN | 1875517 A | 12/2006 |
| CN | 100406431 C | 7/2008 |

(Continued)

OTHER PUBLICATIONS

K. Tsunashima, M. Sugiya. Physical and electrochemical properties of low-viscosity phosphonium ionic liquids as potential electrolytes, Electrochemistry Communications 9 (2007) 2353-2358.*

*Primary Examiner* — Carlos Barcena
(74) *Attorney, Agent, or Firm* — Oliff PLC (57) ABSTRACT

An electrolytic solution for a fluoride ion battery includes: a fluoride salt; and a solvent for dissolving the fluoride salt, in which the solvent is an ether-containing material having a cation and an anion, and in the cation, an ether group represented by —$CH_2$—O—R (where R represents an alkyl group or a fluoroalkyl group) binds to a cation central element which is N or P.

4 Claims, 4 Drawing Sheets (56) References Cited

U.S. PATENT DOCUMENTS

2011/0143219 A1 6/2011 Weiss et al.
2012/0164541 A1 6/2012 Darolles et al.

FOREIGN PATENT DOCUMENTS

| CN | 102731435 A | 10/2012 |
| CN | 102812586 A | 12/2012 |
| CN | 103563154 A | 2/2014 |
| JP | 2013-020835 A | 1/2013 |
| KR | 10-2014-0025330 A | 3/2014 |

* cited by examiner

FIG. 1A

COMPARATIVE EXAMPLE

ELECTROLYTIC SOLUTION FOR FLUORIDE ION BATTERY AND FLUORIDE ION BATTERY

INCORPORATION BY REFERENCE

The disclosure of Japanese Patent Application No. 2014-085450 filed on Apr. 17, 2014 including the specification, drawings and abstract is incorporated herein by reference in its entirety.

BACKGROUND OF THE INVENTION

1. Field of the Invention

The present invention relates to an electrolytic solution for a fluoride ion battery in which a reaction between fluoride ions and a solvent is suppressed.

2. Description of Related Art

As a battery having high voltage and high energy density, for example, a Li ion battery is known. The Li ion battery is a cation-based battery using a reaction between Li ions and a positive electrode active material and a reaction between Li ions and a negative electrode active material. On the other hand, as an anion-based battery, a fluoride ion battery using a reaction of fluoride ions is known. For example, US 2012/0164541 A discloses a fluoride ion battery including: an anode; a cathode; an electrolyte including a fluoride salt; and a predetermined additive.

US 2012/0164541 A describes that an ionic liquid is used as a solvent of an electrolytic solution and that 1-methyl-1-propylpiperidinium (MPP) cation, butyltrimethylammonium (BTMA) cation, or 1-butyl-1-methylpyrrolidinium (BMP) cation is used as a cation of the ionic liquid.

Since the stability of fluoride ions is low, there is a problem in that an activity of fluoridating an active material is low. In other words, due to their high reactivity, fluoride ions react with other materials (in particular, an electrolytic solution) before reacting with an active material. Therefore, there is a problem in that the fluoride ions may not react with the active material sufficiently.

SUMMARY OF THE INVENTION

The invention has been made to provide an electrolytic solution for a fluoride ion battery in which a reaction between fluoride ions and a solvent is suppressed.

According to a first aspect of the invention, there is provided an electrolytic solution for a fluoride ion battery including: a fluoride salt; and a solvent for dissolving the fluoride salt, in which the solvent is an ether-containing material having a cation and an anion, and in the cation, an ether group represented by —$CH_2$—O—R (where R represents an alkyl group or a fluoroalkyl group) binds to a cation central element which is N or P.

According to the invention, the ether-containing material having the specific cation structure is used as the solvent. Therefore, an electrolytic solution for a fluoride ion battery in which a reaction between fluoride ions and a solvent is suppressed can be provided.

The ether-containing material may be an ionic liquid.

The cation central element may be N.

The cation may have a ring structure containing the cation central element.

According to a second aspect of the invention, there is provided a fluoride ion battery including: a positive electrode active material layer; a negative electrode active material layer; and an electrolyte layer that is formed between the positive electrode active material layer and the negative electrode active material layer. The electrolyte layer includes the above-described electrolytic solution for a fluoride ion battery.

According to the invention, by using the above-described electrolytic solution for a fluoride ion battery, a fluoride ion battery having high capacity can be provided.

The electrolytic solution for a fluoride ion battery according to the invention exhibits an effect capable of suppressing a reaction between fluoride ions and a solvent.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an electrolytic solution for a fluoride ion battery and a fluoride ion battery according to embodiments of the invention will be described in detail.

A. Electrolytic Solution for Fluoride Ion Battery

An electrolytic solution for a fluoride ion battery according to the embodiment of the invention includes: a fluoride salt; and a solvent for dissolving the fluoride salt, in which the solvent is an ether-containing material having a cation and an anion, and in the cation, an ether group represented by —$CH_2$—O—R (where R represents an alkyl group or a fluoroalkyl group) binds to a cation central element which is N or P.

According to this electrolytic solution, the ether-containing material having the specific cation structure is used as the solvent. Therefore, an electrolytic solution for a fluoride ion battery in which a reaction between fluoride ions and a solvent is suppressed can be provided. As a result, an activity of fluoride ions fluoridating an active material can be improved, a cell reaction stably occurs in an electrode, and a high-capacity battery can be obtained. The reason why a reaction between fluoride ions and a solvent is suppressed is presumed to be as follows.

Figure 1A:
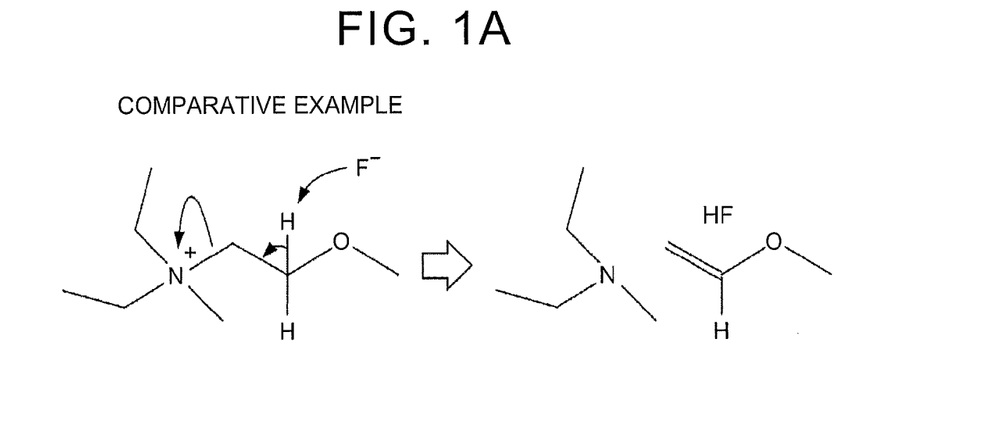
FIGS. 1A and 1B are schematic diagrams showing assumed mechanisms of a comparative example and the present invention.
Figure 1B:
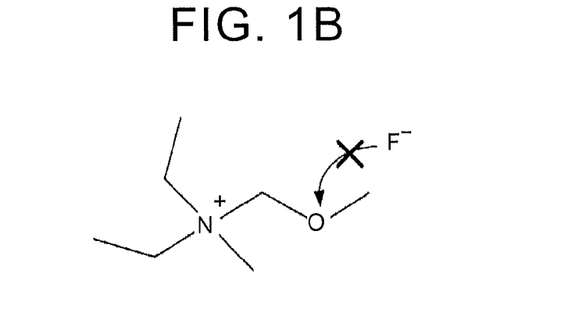

That is, as shown in FIG. 1A, in the case of a cation which contains hydrogen binding to a cation central element (N) through carbon at the β position, the hydrogen is removed by fluoride ions, and the degradation reaction of the cation is likely to occur. That is, Hofmann degradation (chemical self-degradation) of an electrolytic solution is likely to occur. On the other hand, in the embodiment of the invention, since —$CH_2$—O—R binds directly to the cation central element (N) as shown in FIG. 1B, not carbon but oxygen is positioned at the β position. Oxygen has a lone pair and is not likely to be attacked by fluoride ions. As a result, a reaction between fluoride ions and a solvent can be suppressed.

In addition, in the embodiment of the invention, since the stability of fluoride ions is improved, an effect of improving the coulombic efficiency and an effect of preventing the formation of hydrofluoric acid (HF) are also obtained. Hereinafter, each configuration of the electrolytic solution for a fluoride ion battery according to the embodiment of the invention will be described.

1. Solvent

In the embodiment of the invention, the solvent is an ether-containing material having a cation and an anion, and in the cation, an ether group represented by —$CH_2$—O—R (where R represents an alkyl group or a fluoroalkyl group) binds to a cation central element which is N or P. The ether-containing material is not particularly limited as long as it has the specific cation. Among the materials having the specific cation, an ionic liquid is preferably used because it has low volatility. In the embodiment, the ionic liquid is a material having a melting point of 100° C. or lower. The melting point of the ionic liquid is preferably 50° C. or lower and more preferably 25° C. or lower. In addition, typically, the ether-containing material is aprotic. Since fluoride ions react with protons to produce hydrofluoric acid, an aprotic material is used as the solvent. That is, the solvent according to the embodiment is a material which is not reactive with F or a material in which a battery reaction substantially occurs even in a reaction with F.

In the ether-containing material, the cation contains N or P as the central element thereof. It is preferable that the cation central element is N because the coulombic efficiency can be improved. The reason for the improvement of the coulombic efficiency is presumed to be as follows: as compared to P, N has a lower charge as the cation central element (higher electronegativity) and has higher stability to fluoride ions. In addition, since N has a lower charge as the cation central element, fluoride ions are likely to be separated from a fluorinated active material (defluoridation is likely to occur).

In the cation of the ether-containing material, an ether group represented by —$CH_2$—O—R (where R represents an alkyl group or a fluoroalkyl group) binds to the cation central element. The number of carbon atoms in R is not particularly limited but, for example, is 10 or less, preferably 6 or less, more preferably 4 or less, and still more preferably 2 or less. In addition, the number of the ether groups binding to the cation central element is not particularly limited and may be one or two or more. In addition, all the functional groups binding to the cation central element may be the ether groups.

The cation of the ether-containing material may have a chain structure or a ring structure. The cation having a chain structure may be, for example, a cation represented by the following formula.

In the formula, $R^1$ to $R^3$ each independently represent hydrogen, an alkyl group, a fluoroalkyl group, or a —$CH_2$—O—R group. When $R^1$ to $R^3$ represent an alkyl group or a fluoroalkyl group, the number of carbon atoms thereof is, for example, 10 or less, preferably 6 or less, more preferably 4 or less, and still more preferably 2 or less. It is particularly preferable that $R^1$ to $R^3$ represent hydrogen, or an alkyl group or a fluoroalkyl group having 4 or less carbon atoms (preferably 2 or less carbon atoms).

The cation having a chain structure may be, for example, a cation represented by the following formula.

In the formula, $R^1$ to $R^3$ each independently represent hydrogen, an alkyl group, a fluoroalkyl group, or a —$CH_2$—O—R group. When $R^1$ to $R^3$ represent an alkyl group or a fluoroalkyl group, the number of carbon atoms thereof is, for example, 10 or less, preferably 6 or less, more preferably 4 or less, and still more preferably 2 or less. It is particularly preferable that $R^1$ to $R^3$ represent hydrogen, or an alkyl group or a fluoroalkyl group having 4 or less carbon atoms (preferably 2 or less carbon atoms).

When the cation of the ether-containing material has a ring structure, the cation is regularly arranged at an interface with an active material, and a structure in which fluoride ions are likely to be diffused can be formed. As a result, the reaction rate of at least one of fluoridation and defluoridation of an active material can be improved (the reaction resistance can be reduced). It is preferable that the ring structure is a heterocyclic structure containing the cation central element (N or P). In addition, the ring structure may be aromatic or non-aromatic. When the ring structure is aromatic, it is presumed that fluoride ions are likely to move due to a stacking structure.

The cation having a ring structure may be, for example, a cation represented by the following formula.

In the formula, $R^1$ represents hydrogen, an alkyl group, a fluoroalkyl group, or a —$CH_2$—O—R group, and $R_2$ represents a functional group for forming a ring structure which contains at least carbon. When $R^1$ represents an alkyl group or a fluoroalkyl group, the number of carbon atoms thereof is, for example, 10 or less, preferably 6 or less, more preferably 4 or less, and still more preferably 2 or less. It is particularly preferable that $R^1$ represents hydrogen, or an alkyl group or a fluoroalkyl group having 4 or less carbon atoms (preferably 2 or less carbon atoms). The ring structure containing N and $R^2$ may be a five-membered ring structure, a six-membered ring structure, or a seven-membered ring structure. In addition, the ring structure containing N and $R^2$ may be aromatic or non-aromatic. In addition, for example, it is preferable that the ring structure containing N and $R^2$ is a pyrrolidine structure, a pyrrole structure, a piperidine structure, or a pyridine structure. Some or all of the hydrogen atoms in each structure may be substituted with fluorine atoms.

The anion of the ether-containing material is electrically repulsive to fluoride ions and thus does not react with fluoride ions basically. Therefore, the kind of the anion of the ether-containing material is not particularly limited. Examples of the anion of the ether-containing material include an amide anion represented by a bis(fluorosulfonyl)amide (FSA) anion or a bis(trifluoromethanesulfonyl)amide (TFSA) anion; a phosphate anion represented by a hexafluorophosphate anion and a tris(pentafluoroethyl)trifluorophosphate anion; a tetrafluoroborate (TFB) anion; and a triflate anion.

The solvent used in the embodiment of the invention may be the above-described ether-containing material or a mixed solvent of the above-described ether-containing material and another solvent. A ratio of the ether-containing material with respect to all the solvents is, for example, 10 mol % or more, preferably 30 mol % or more, more preferably 50 mol % or more, and still more preferably 70 mol % or more.

As the other solvent, a commonly-used nonaqueous solvent can be used, and examples thereof include ethylene carbonate (EC), fluoroethylene carbonate (FEC), difluoroethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, dimethyl sulfoxide (DMSO), and arbitrary mixtures of the above-described nonaqueous solvents.

2. Fluoride Salt

The fluoride salt according to the embodiment of the invention is not particularly limited as long as it can produce fluoride ions which are reactive with an active material, and may be an organic fluoride salt or an inorganic fluoride salt. In addition, the fluoride salt may be an ionic liquid.

A cation of the fluoride salt is not particularly limited, and examples thereof include a complex cation. Examples of the complex cation include an alkylammonium cation, an alkylphosphonium cation, and an alkylsulfonium cation. The alkylammonium cation may be, for example, a cation represented by the following formula.

In the formula, $R^1$ to $R^4$ each independently represent an alkyl group or a fluoroalkyl group. The number of carbon atoms in $R^1$ to $R^4$ is, for example, 10 or less, and may be 5 or less or may be 3 or less.

An anion of the fluoride salt is not particularly limited as long as it can produce fluoride ions which are reactive with an active material, but is preferably $F^-$.

A concentration of the fluoride salt in the electrolytic solution is, for example, within a range of 0.4 mol % to 45 mol % and preferably within a range of 0.7 mol % to 10 mol %.

3. Electrolytic Solution for Fluoride Ion Battery

In the embodiment according to the invention, as shown in FIG. 1B, the ether-containing material having the specific cation structure is used as the solvent. Therefore, a reaction between fluoride ions and the solvent is suppressed. In the embodiment, since this ether-containing material is used as the solvent, a molar ratio of the cation is more than 1 with respect to fluoride ions contained in the electrolytic solution. The molar ratio is, for example, 1.004 or more, preferably 1.02 or more, more preferably 5 or more, and still more preferably 10 or more. On the other hand, the molar ratio is, for example, preferably 200 or less. In addition, the molar ratio can be calculated from the concentrations of the fluoride ions and the cation in the electrolytic solution. These concentrations can be obtained using, for example, $^{19}$F-NMR or $^1$H-NMR.

In an $F(HF)_x^-$ anion, F is not likely to be dissociated from HF. Therefore, it may be difficult to sufficiently fluoridate an active material. When x represents a real number of more than 0, for example, $0<x\leq5$ is satisfied. Therefore, it is preferable that the electrolytic solution for a fluoride ion battery does not substantially contain an $F(HF)_x^-$ anion. "Substantially not containing an $F(HF)_x^-$ anion" represents that a ratio of the $F(HF)_x^-$ anion to all the anions present in the electrolytic solution is 0.5 mol % or less. The ratio of the $F(HF)_x^-$ anion is preferably 0.3 mol % or less.

B. Fluoride Ion Battery

Figure 2:
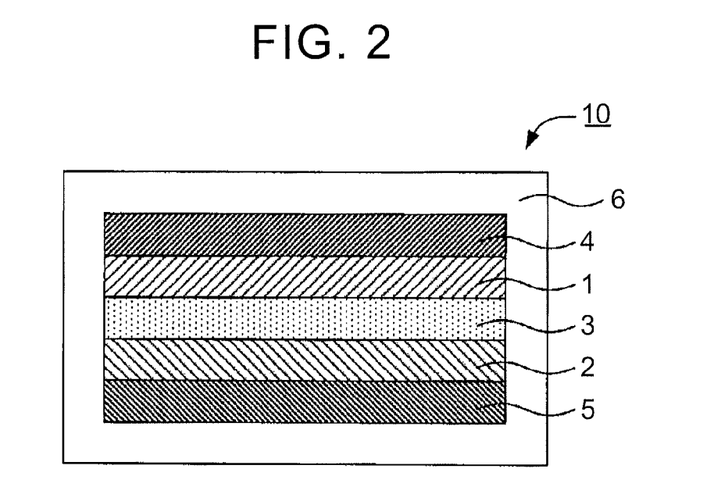
FIG. 2 is a schematic cross-sectional diagram showing an example of a fluoride ion battery according to the present invention.

FIG. 2 is a schematic cross-sectional diagram showing an example of a fluoride ion battery according to an embodiment of the present invention. A fluoride ion battery 10 shown in FIG. 2 includes: a positive electrode active material layer 1; a negative electrode active material layer 2; an electrolyte layer 3 that is formed between the positive electrode active material layer 1 and the negative electrode active material layer 2; a positive electrode current collector 4 that collects the current of the positive electrode active material layer 1; a negative electrode current collector 5 that collects the current of the negative electrode active material layer 2; and a battery case 6 that accommodates these members. In addition, the electrolyte layer 3 contains "A. Electrolytic Solution for Fluoride Ion Battery" described above.

According to the embodiment of the invention, by using the above-described electrolytic solution for a fluoride ion battery, a fluoride ion battery having high capacity can be provided. Hereinafter, each configuration of the fluoride ion battery according to the embodiment of the invention will be described.

1. Electrolyte Layer

The electrolyte layer according to the embodiment of the invention is a layer that is formed between the positive electrode active material layer and the negative electrode active material layer. In the embodiment, the electrolyte layer contains the above-described electrolytic solution for a fluoride ion battery. The thickness of the electrolyte layer greatly varies depending on the configuration of the battery and is not particularly limited.

2. Positive Electrode Active Material Layer

The positive electrode active material layer according to the embodiment of the invention contains at least the positive electrode active material. In addition to the positive electrode active material, the positive electrode active material layer may further contain at least one of a conductive material and a binder.

Typically, the positive electrode active material according to the embodiment is an active material which is defluoridated during discharging. Examples of the positive electrode active material include metal alone, alloys, metal oxides, and fluorides of the above positive electrode active materials. Examples of a metal element contained in the positive electrode active material include Cu, Ag, Ni, Co, Pb, Ce, Mn, Au, Pt, Rh, V, Os, Ru, Fe, Cr, Bi, Nb, Sb, Ti, Sn, and Zn. Among these, Cu, $CuF_x$, Fe, $FeF_x$, Ag, and $AgF_x$ are preferably used as the positive electrode active material. In the above description, x represents a real number of more than 0. Cu and $CuF_x$ are preferably used because they have high energy density. In addition, additional examples of the positive electrode active material include carbon materials and fluorides thereof. Examples of the carbon materials include graphite, coke, and carbon nanotube. In addition, further additional examples of the positive electrode active material include polymer materials. Examples of the polymer materials include polyaniline, polypyrrole, polyacetylene, and polythiophene.

The conductive material is not particularly limited as long as it has desired electron conductivity, and for example, a carbon material may be used. Examples of the carbon material include carbon blacks such as acetylene black, Ketjen black, furnace black, and thermal black. On the other hand, the binder is not particularly limited as long as it is chemically and electrically stable, and examples thereof include fluorine-based binders such as polyvinylidene fluoride (PVDF) and polytetrafluoroethylene (PTFE). In addition, the higher the content of the positive electrode active material in the positive electrode active material layer, the better from the viewpoint of capacity. In addition, the thickness of the positive electrode active material layer greatly varies depending on the configuration of the battery and is not particularly limited.

3. Negative Electrode Active Material Layer

The negative electrode active material layer according to the embodiment of the invention contains at least the negative electrode active material. In addition to the negative electrode active material, the negative electrode active material layer may further contain at least one a conductive material and a binder.

Typically, the negative electrode active material according to the embodiment is an active material which is fluoridated during discharging. In addition, as the negative electrode active material, an arbitrary active material having a lower potential than the positive electrode active material may be selected. Therefore, the above-described positive electrode active materials may be used as the negative electrode active material. Examples of the negative electrode active material include metal alone, alloys, metal oxides, and fluorides of the above negative electrode active materials. Examples of a metal element contained in the negative electrode active material include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among these, Mg, $MgF_x$, Al, $AlF_x$, Ce, $CeF_x$, Ca, $CaF_x$, Pb, and $PbF_x$ are preferably used as the negative electrode active material. In the above description, x represents a real number of more than 0. In addition, as the negative electrode active material, the above-described carbon materials and polymer materials may also be used.

As the conductive material and the binder, the same materials as those described above in the positive electrode active material layer may be used. In addition, the higher the content of the negative electrode active material in the negative electrode active material layer, the better from the viewpoint of capacity. In addition, the thickness of the negative electrode active material layer greatly varies depending on the configuration of the battery and is not particularly limited.

4. Other Configurations

The fluoride ion battery according to the embodiment of the invention includes at least the negative electrode active material layer, the positive electrode active material layer, and the electrolyte layer described above. Typically, the fluoride ion battery further includes the positive electrode current collector that collects the current of the positive electrode active material layer; and the negative electrode current collector that collects the current of the negative electrode active material layer. Examples of the shape of the current collector include a foil shape, a mesh shape, and a porous shape. In addition, the fluoride ion battery according to the embodiment may further include a separator that is formed between the positive electrode active material layer and the negative electrode active material layer because a battery having higher safety can be obtained.

5. Fluoride Ion Battery

The fluoride ion battery according to the embodiment of the invention is not particularly limited as long as it includes the positive electrode active material layer, the negative electrode active material layer, and the electrolyte layer described above. In addition, the fluoride ion battery according to the embodiment may be a primary battery or a secondary battery. However, the fluoride ion battery is preferably a secondary battery because it can be repeatedly charged and discharged and is useful as, for example, a vehicle-mounted battery. In addition, examples of the fluoride ion battery according to the embodiment include a coin type, a laminate type, a cylindrical type, and a square type.

The invention is not particularly limited to the above-described embodiments. The embodiments are exemplary.

Hereinafter, the invention will be described in more detail using Examples.

(Preparation of Solvent)

A solvent used for an electrolytic solution was prepared. All the following solvents were obtained from Kanto Chemical Co., Inc.

Triethyl(methoxymethyl)phosphonium bis(trifluoromethanesulfonyl)amide (P2221o1TFSA) is commercially available.

N,N-diethyl-N-methyl-N-(2-methoxymethyl)ammonium bis(trifluorosulfonyl)amide (N1221o1TFSA) was synthesized from N,N-diethylmethylamine and bromomethyl methyl ether using the same synthesis method as that of N,N-diethyl-N-methyl-N-(2-methoxyethyl)ammonium bis(trifluoromethanesulfonyl)amide (DEMETFSA) which is a well-known material.

N-methyl-N-methoxymethyl-pyrrolidinium bis(trifluoromethanesulfonyl)amide (P11o1TFSA) was synthesized from N-methylpyrrolidine and bromomethyl methyl ether using the same synthesis method as that of N,N-diethyl-N-methyl-N-(2-methoxyethyl)ammonium bis(trifluoromethanesulfonyl)amide (DEMETFSA) which is a well-known material.

Triethyl(methoxyethyl)phosphonium bis(trifluoromethanesulfonyl)amide (P2221o2TFSA) is commercially available.

N,N,N-trimethyl-N-propylammonium bis(trifluoromethanesulfonyl)amide (N1113TFSA) is commercially available.

N,N-diethyl-N-methyl-N-(2-methoxyethyl)ammonium bis(trifluoromethanesulfonyl)amide (DEMETFSA) is commercially available.

Example 1

Tetramethyl ammonium fluoride (TMAF, fluoride salt, manufactured by Alfa Aesar Co., LLC.) and Triethyl (methoxymethyl)phosphonium bis(trifluoromethanesulfonyl)amide (P2221o1TFSA, solvent) were weighed and mixed at a molar ratio (fluoride salt:solvent) of 1:50. Next, the mixture was stirred in a fluororesin hermetic container under conditions of 60° C. and 12 hours. As a result, an evaluation electrolytic solution was obtained.

Example 2

An evaluation electrolytic solution was obtained with the same method as that of Example 1, except that N1221o1TFSA was used as the solvent.

Example 3

An evaluation electrolytic solution was obtained with the same method as that of Example 1, except that P11o1 TFSA was used as the solvent.

Comparative Example 1

An evaluation electrolytic solution was obtained with the same method as that of Example 1, except that P2221o2TFSA was used as the solvent.

Comparative Example 2

An evaluation electrolytic solution was obtained with the same method as that of Example 1, except that N1113TFSA was used as the solvent.

Comparative Example 3

Figure 3:
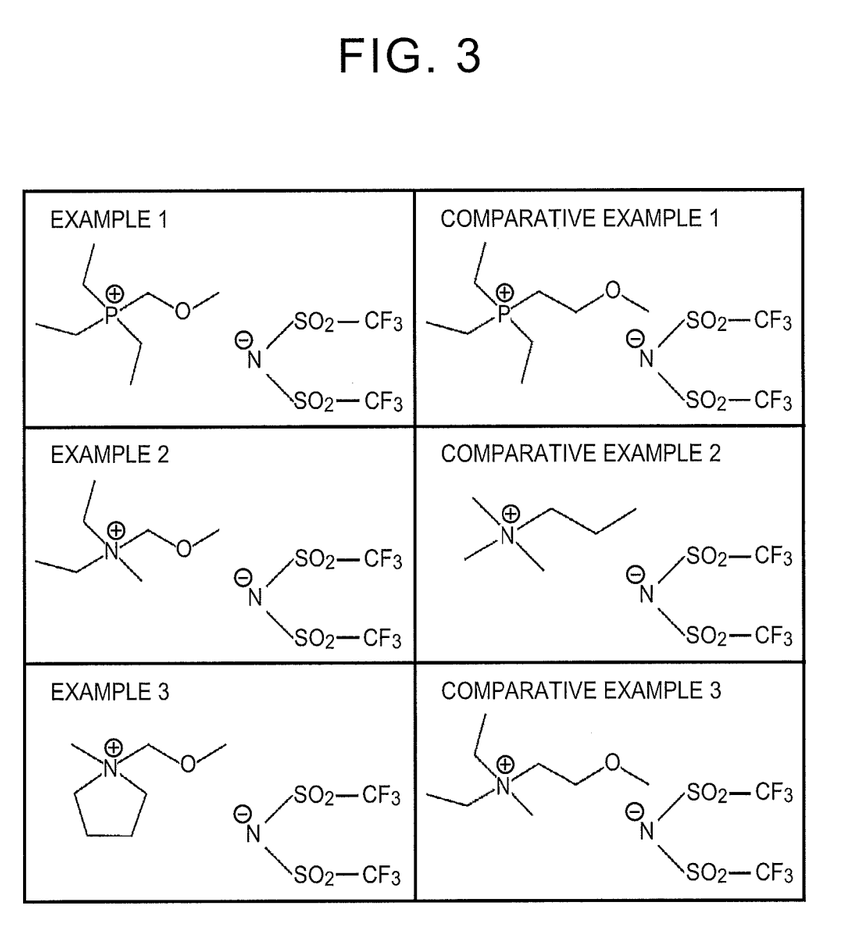
FIG. 3 is a diagram showing chemical formulae of solvents used in Examples 1 to 3 and Comparative Examples 1 to 3.

An evaluation electrolytic solution was obtained with the same method as that of Example 1, except that DEMETFSA was used as the solvent. FIG. 3 shows chemical formulae of solvents used in Examples 1 to 3 and Comparative Examples 1 to 3.

[Evaluation]
(Cyclic Voltammetry Measurement)

CV measurement was performed on the evaluation electrolytic solutions obtained in Examples 1 to 3 and Comparative Examples 1 to 3. Specifically, a dipping type three-electrode cell was evaluated in a glove box in an Ar atmosphere. A Cu plate was used as a working electrode, and a mixed electrode of PTFE, acetylene black (AB), and carbon fluoride was used as a counter electrode. The mixed electrode contains PTFE, acetylene black (AB), and carbon fluoride at a weight ratio of 1:2:7. In addition, Vycor glass was used as a reference electrode and was separated from an evaluation electrolytic solution. In the reference electrode, Ag wire was dipped in an acetonitrile solution in which silver nitrate and tetrabutylammonium perchlorate were respectively dissolved at a concentration of 0.1 M. In addition, the measurement was performed under conditions of room temperature and a sweep rate of 10 mV/s. In addition, in Reference Example, the measurement was performed on the evaluation electrolytic solution obtained in Example 1 using the same method as described above, except that a Pt plate was used as a working electrode.

Figure 4:
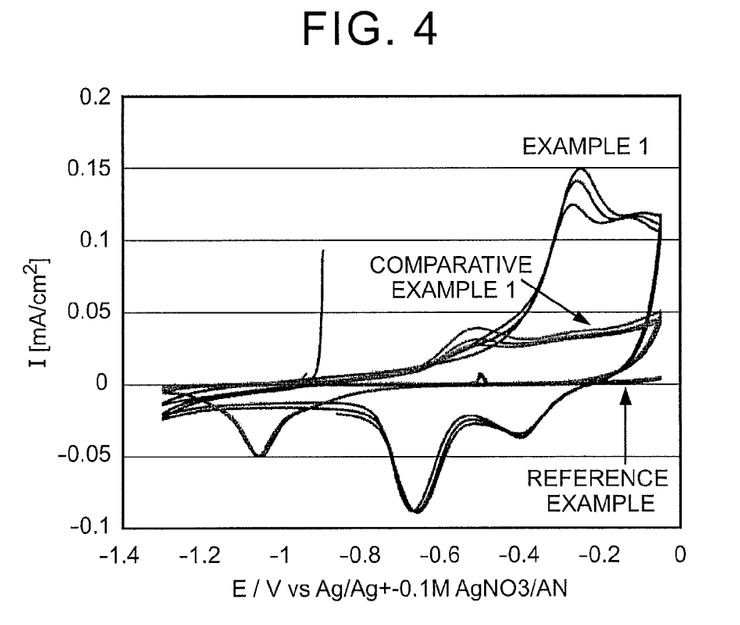
FIG. 4 is a graph showing the results of CV measurement on evaluation electrolytic solutions obtained in Example 1 and Comparative Example 1.

FIG. 4 is a graph showing the results of CV measurement on evaluation electrolytic solutions obtained in Example 1 and Comparative Example 1. As shown in FIG. 4, it was verified that, in Reference Example in which the Pt electrode was used, the evaluation electrolytic solution was not degraded in the measurement range. In addition, in Example 1 in which the Cu electrode was used, an oxidation current peak formed along with the fluoridation of copper was observed at about −0.3 V, and a reduction current peak formed along with the defluoridation of copper fluoride was observed at about −0.7 V. On the other hand, in Comparative Example 1, unlike in Example 1, an oxidation current peak formed along with the fluoridation of copper and a reduction current peak formed along with the defluoridation of copper fluoride were not observed. In this way, when the solvent having a cation in which a predetermined ether group bound to a cation central element was used, the fluoridation and defluoridation of the metal were observed.

Figure 5:
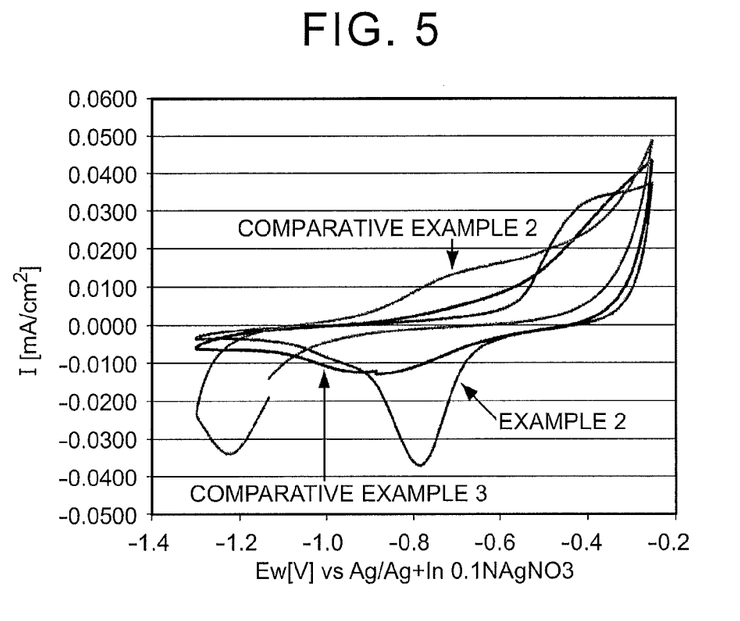
FIG. 5 is a graph showing the results of CV measurement on evaluation electrolytic solutions obtained in Example 2 and Comparative Examples 2 and 3.

FIG. 5 is a graph showing the results of CV measurement on evaluation electrolytic solutions obtained in Example 2 and Comparative Examples 2 and 3. As shown in FIG. 5, in Example 2, an oxidation current peak formed along with the fluoridation of copper was observed at about −0.4 V, and a reduction current peak formed along with the defluoridation of copper fluoride was observed at about −0.8 V. On the other hand, in Comparative Examples 2 and 3, unlike in Example 2, an oxidation current peak formed along with the fluoridation of copper and a reduction current peak formed along with the defluoridation of copper fluoride were not observed. In this way, when the solvent having a cation in which a predetermined ether group bound to a cation central element was used, the fluoridation and defluoridation of the metal were observed.

(Evaluation of Coulombic Efficiency)

Figure 6:
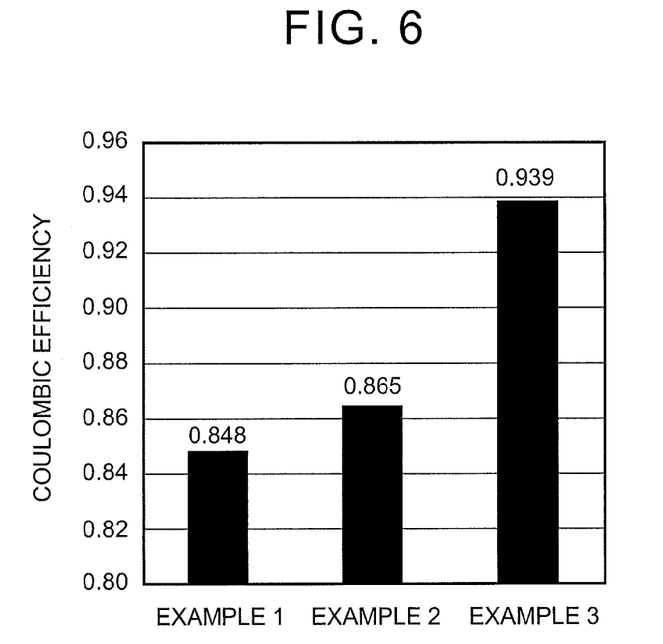
FIG. 6 is a graph showing the results of evaluating the coulombic efficiency of evaluation electrolytic solutions obtained in Examples 1 to 3.

The coulombic efficiency was calculated from the results of the CV measurement. Specifically, the coulombic efficiency was calculated by dividing the amount of reduction electricity at −1.0 V to −0.55 V during a sweep to a low potential side by the amount of reduction electricity at −0.55 V to −0.25 V during a sweep to a high potential side. The results are shown in FIG. 6. As shown in FIG. 6, in Examples 2 and 3 in which the cation central element was N, the coulombic efficiency (reversibility of fluoridation and defluoridation) was higher than that in Example 1 in which the cation central element was P. In particular, in Example 3, the coulombic efficiency was significantly high.

(Evaluation of Reaction Resistance)

Figure 7:
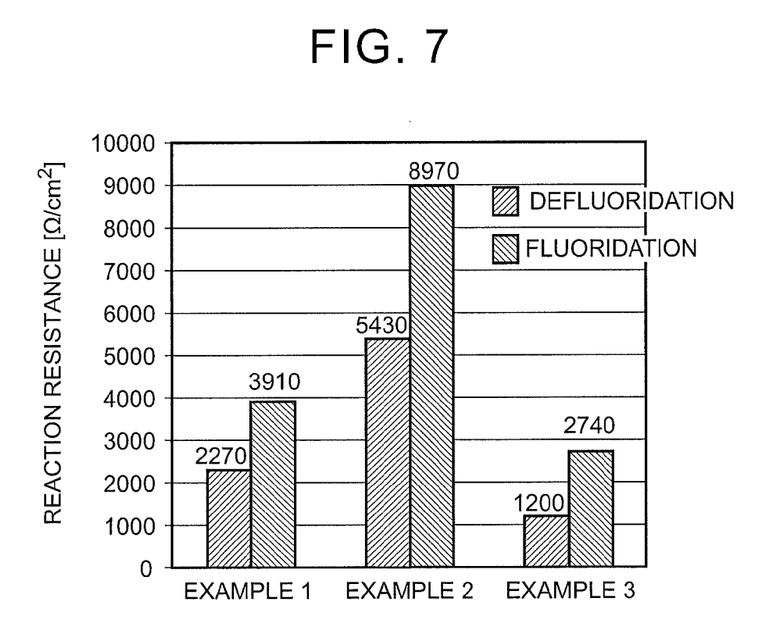
FIG. 7 is a graph showing the results of evaluating the reaction resistance of evaluation electrolytic solutions obtained in Examples 1 to 3.

The reaction resistance was calculated from the results of the CV measurement. Specifically, the reaction resistance was calculated using a tangent line approximation of a slope ranging from a potential, where a current peak rose, to 50 mV during each of fluoridation and defluoridation (a correlation coefficient of 0.99 or higher at 50 points). The results are shown in FIG. 7. As shown in FIG. 7, in Example 3 containing the cation having a ring structure, the reaction resistance was lower than that of Examples 1 and 2 containing the cation having a straight chain structure. Therefore, it was verified that Example 3 contributed most to the improvement of rate characteristics.

What is claimed is:
1. A fluoride ion battery comprising:
   a positive electrode active material layer;
   a negative electrode active material layer; and
   an electrolyte layer that is formed between the positive electrode active material layer and the negative electrode active material layer,
   wherein the electrolyte layer comprises an electrolytic solution comprising:
      a fluoride salt; and
      a solvent for dissolving the fluoride salt, wherein the solvent comprises:
         a cation that comprises an ether group, an R1 group, an R2 group, and an R3 group; and
         an anion,
      wherein, in the cation,
         the ether group is represented by —$CH_2$—O—R and binds directly to a cation central element that is N or P,

R1 to R3 directly bind to the cation central element and are an alkyl group having 1 or 2 carbons or fluoroalkyl group having 1 or 2 carbons, or R1 is an alkyl group having 1 or 2 carbons or fluoroalkyl group having 1 or 2 carbons and R2 and R3 combine to form a cyclic structure, and R represents an alkyl group or a fluoroalkyl group, and a concentration of the fluoride salt in the electrolyte solution is ranges from 0.7 mol % to 10 mol %.

2. The fluoride ion battery according to claim 1, wherein the ether-containing material is an ionic liquid.

3. The fluoride ion battery according to claim 1, wherein the cation central element is N.

4. The fluoride ion battery according to claim 1, wherein the cation has a cyclic structure containing the cation central element.

* * * * *